United States Patent
Schneider et al.

(10) Patent No.: US 10,246,000 B2
(45) Date of Patent: Apr. 2, 2019

(54) PARKING ASSISTANCE SYSTEM

(71) Applicant: GM GLOBAL TECHNOLOGY OPERATIONS LLC, Detroit, MI (US)

(72) Inventors: Ingolf Schneider, Ruesselsheim (DE); Philipp Roeckl, Ruesselsheim (DE); Martin Petermann, Ruesselsheim (DE); Peter Kahler, Ruesselsheim (DE); Marten Wittorf, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 15/482,424

(22) Filed: Apr. 7, 2017

(65) Prior Publication Data
US 2017/0291529 A1    Oct. 12, 2017

(30) Foreign Application Priority Data

Apr. 8, 2016    (DE) .................. 10 2016 004 259

(51) Int. Cl.
| | |
|---|---|
| *B60Q 1/00* | (2006.01) |
| *B60Q 1/06* | (2006.01) |
| *B60Q 1/24* | (2006.01) |
| *B60Q 1/08* | (2006.01) |
| *B60Q 1/14* | (2006.01) |
| *B60Q 1/48* | (2006.01) |

(Continued)

(52) U.S. Cl.
CPC ......... *B60Q 1/0023* (2013.01); *B60Q 1/0035* (2013.01); *B60Q 1/06* (2013.01); *B60Q 1/085* (2013.01); *B60Q 1/143* (2013.01); *B60Q 1/24* (2013.01); *B60Q 1/48* (2013.01); *B60Q 9/007* (2013.01); *B62D 15/027* (2013.01); *B60Q 2300/054* (2013.01); *B60Q 2300/45* (2013.01); *B60Q 2400/50* (2013.01)

(58) Field of Classification Search
None
See application file for complete search history.

(56) References Cited

U.S. PATENT DOCUMENTS

| | | | |
|---|---|---|---|
| 5,701,122 A * | 12/1997 | Canedy ............... | B60Q 9/007 340/435 |
| 2012/0044090 A1 * | 2/2012 | Kahler ............... | B60Q 1/50 340/905 |

(Continued)

FOREIGN PATENT DOCUMENTS

| | | | | |
|---|---|---|---|---|
| DE | 102009058034 A1 | 8/2010 | | |
| DE | 102011115670 A1 * | 3/2013 | ............... | B60Q 1/48 |

(Continued)

OTHER PUBLICATIONS

German Patent Office, German Search Report for German Application No. 102016004259.1.

*Primary Examiner* — Tamara L Weber
(74) *Attorney, Agent, or Firm* — Lorenz & Kopf, LLP (57) ABSTRACT

A parking assistance system for a motor vehicle includes a monitoring unit for detecting an object in the vicinity of the vehicle and a light system connected to the monitoring unit and configured to emit light into the area surrounding the motor vehicle. The monitoring unit is configured to sense the bearing of an object and to control the distribution of the light emitted from the light system as a function of the sensed bearing.

11 Claims, 4 Drawing Sheets

(51) Int. Cl.
*B62D 15/02* (2006.01)
*B60Q 9/00* (2006.01)

(56) References Cited

U.S. PATENT DOCUMENTS

| | | | |
|---|---|---|---|
| 2013/0311035 A1* | 11/2013 | Czyz | B60Q 1/0023 |
| | | | 701/36 |
| 2015/0203026 A1* | 7/2015 | Schotanus | B60Q 1/24 |
| | | | 362/520 |
| 2018/0194272 A1* | 7/2018 | Hibino | B60Q 1/143 |

FOREIGN PATENT DOCUMENTS

| | | | | |
|---|---|---|---|---|
| DE | 102011115670 A1 | 3/2013 | | |
| DE | 102013213064 A1 * | 1/2015 | ............ | B60W 30/06 |
| DE | 102013213064 A1 | 1/2015 | | |

* cited by examiner

PARKING ASSISTANCE SYSTEM

CROSS-REFERENCE TO RELATED APPLICATION

This application claims priority to German Patent Application No. 102016004259.1, filed Apr. 8, 2016, which is incorporated herein by reference in its entirety.

TECHNICAL FIELD

The present disclosure pertains to a parking assistance system and a method of assisting the parking of a motor vehicle.

BACKGROUND

Parking assistance systems may be incorporated into a motor vehicle with a motoring unit for sensing an object in the vicinity of the motor vehicle, e.g. on the basis of radar signals, and a signal emitter controlled as a function of the results of a sensed object are generally known. The signal emitter can be a display on which the position of the object relative to the motor vehicle and its distance therefrom is visualized, in addition an acoustic signal emitter may be provided. From this information, the driver can estimate the distance from the object, irrespective of the direction in which he or she is looking.

DE 10 2009 058 034 A1 describes a parking assistance system with a monitoring unit which can also continue to be operated after completion of the parking in order to monitor, on the parked motor vehicle, the approach of other motor vehicles to the parked motor vehicle, and a lamp, which is controlled by the monitoring system to warn the driver of such another motor vehicle by way of a light signal of a critical approach.

The beeping sounds used as acoustic warning signals by most conventional parking assistance systems are considered as unpleasant or annoying by many users, particularly if the sound level is poorly adapted to the noise level of the surroundings. If a driver who feels annoyed by the signals of a conventional parking assistance system turns down its sound level, there is the risk that when the motor vehicle is subsequently driven by another driver who is not aware of the reduced sound level, this driver may not hear the signals and thus presumes that there is no obstacle in the way.

A further problem is that the acoustic signals used usually have a high frequency in order to be easily perceived by a driver with normal hearing against a background of engine sounds at lower frequencies, but drivers with a degree of hearing loss may find such signal difficult to discern.

SUMMARY

The present disclosure provides a parking assistance system for a motor vehicle or a method of assisting the parking of a motor vehicle which achieves a high degree of reliability without being dependent on acoustic signals. In one aspect, a parking assistance system for a motor vehicle with a monitoring unit for detecting an object in the vicinity of the vehicle and a lighting system which in order to emit light into the area surrounding the motor vehicle is connected to the monitoring unit. The monitoring unit is configured to sense the bearing of an object and to control the distribution of the light emitted from the lighting system as a function of the sensed bearing. As it is to be assumed that as the driver of the motor vehicle observes his/her surroundings when parking, he/she will not fail to notice the change in light distribution and will recognise that there is an object in the vicinity of the vehicle with which a collision is possible.

Such a control system could, for example, include sensing a bearing angle, which shows the direction in which the object lies in relation to the motor vehicle in a vehicle-based coordinate system and directing a directable light source onto the detected object and thus increasing its conspicuousness to the driver. However, such a procedure has the drawback that low-lying objects in the vicinity of the motor vehicle may be hidden from the driver's view by the bodywork and cannot therefore be seen when they are selectively illuminated. Problems can also arise if the object has already been passed and is no longer in the driver's line of vision. For example, when parking in a multi-storied car park or parking garage, it is possible to scrape a column adjoining a parking space with a rear section of the vehicle body while the driver is looking forwards in order not to hit a wall delimiting the parking space. It is therefore expedient to control the light distribution in a spatial area in a driving direction in front of the driver, irrespective of whether the detected object is located in this spatial area or is already behind the driver.

Sensing the object bearing may be as simple as determining which side of the motor vehicle a detected object is located. The result of detecting the object and, if applicable, the decision, can be signalled to the driver in a simple and reliable manner if the control unit is configured to produce a first light distribution if no object is detected, a second light distribution on detecting of an object on the left-hand side of the motor vehicle and a third light distribution on detecting of an object on the right-hand side of the motor vehicle.

In order to produce these different light distributions a pair of lights on different side of a middle plane of the motor vehicle is sufficient. The monitoring unit is then configured to operate both lights in an identical first operating state in order to produce the first light distribution, and to produce the second and third light distribution to operate in each case one light in the first operating condition and the other light in a second operating condition differing from the first operating condition.

Conventionally, as lights for the parking assistance system according to the present disclosure lamps which are available in pairs on any motor vehicle authorized for road traffic, such as indicators or front headlights, can be used. The upgrading of a conventional parking assistance system providing an acoustic signal to form a system according to the present disclosure therefore requires no additional components and is possible with minimal cost outlay.

Expediently the monitoring unit is not only configured to take bearings, but also for sensing the distance of the object and to control at least one property of the light of the lamp in the second operating condition as a function of the sensed distance. The driver therefore receives feedback not only about the presence of an object but also about its distance and can therefore reliably assess the danger posed by the object.

The controlled property of the light source can be selected from among the intensity, color, spatial distribution or time distribution of the light. Control of the intensity or time distribution is possible in the case of practically all lights commonly used in the motor vehicle sector. In the case of conventional front headlights control of the spatial distribution can be achieved by switching between full or high beams and dipped or low beam. In the case of modern adaptive frontlight system (AFS) headlights the light level of which follows the angle the steering wheel is turned when travelling on open roads, the change in the spatial distribution can be obtained through turning that is independent of the angle of turning of the steering wheel. Matrix headlights with several elemental light sources that can be controlled independently of each other offer much further-reaching possibilities of varying the spatial distribution.

Particularly with matrix headlights, but also in the case of other type of headlights, control of the spatial distribution can include an opening angle between two light-dark boundaries of the emitted light being varied. By way of the dimensions or proportions of a pattern projected onto a surface located in front of the vehicle the driver can estimate the distance to the object with a good degree of reliability. Sensing of the bearing can also involve a decision as to whether a detected object is in front of the motor vehicle in the direction of travel. If this is the case the control unit should produce a third light distribution. In the simplest case the third light distribution can be obtained in that both aforementioned lights are operated in the second operating condition. However, it is also conceivable to provide a third operating condition for both lights.

The bearing of the objects can be simply illustrated to the driver in that the orientation of the light-dark boundaries in the second and the third operating condition is different in each case. This task is also solved by the operational method carried out by the above-described parking assistance system, more particularly by a method of supporting the parking of a motor vehicle. The bearing of an object in the vicinity of the motor vehicle is sensed. The distribution of light emitted by the motor vehicle's light system into the surrounding area is controlled by way of the sensed bearing. According to a further embodiment the task is solved by a computer program product which includes instructions that when executed on a computer implement the afore-described method. The present disclosure also contemplates a non-tranitory computer-readable medium on which program instructions are recorded which enable a computer to implement the above-described method.

A further subject matter is a device for supporting the parking of a motor vehicle configured to sense the bearing of an object in the vicinity of the motor vehicle; and control, by way of the sensed bearing, the distribution of light emitted by the motor vehicle's light system into the surrounding area. Such a device can in particular be in the form of a computer on which the above-described computer program product can be implemented.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
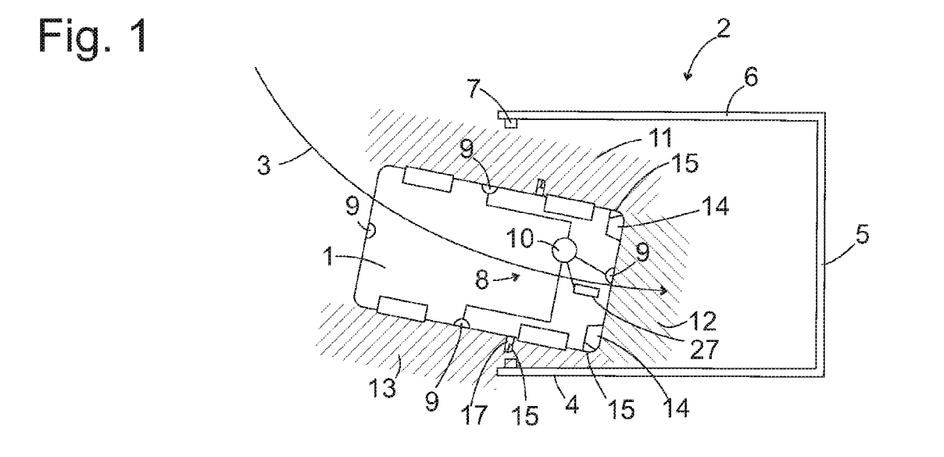
FIG. 1 shows a motor vehicle equipped with a parking assistance system according to the present disclosure in a typical usage situation.

FIG. 1 schematically shows a view from above of a motor vehicle 1 when parking in a garage 2. The motor vehicle 1 reaches the garage 2 on a curved path symbolized by an arrow 3. The width of the garage 2 is narrow; so that there is sufficient space to get out on the driver's side, the driver steers the motor vehicle 1 close to the right-hand wall of the garage 4 and must ensure that he does not scrape against it. On the one hand, the driver must bring the motor vehicle 1 to a standstill close enough to the end wall 5 of the garage in order to be able to close the garage door and on the other hand the motor vehicle 1 must not come into contact with the end wall 5.

If the motor vehicle 1—in contrast to the case considered in FIG. 1—has the steering wheel on the right, the driver will normally try to park it by the left-hand garage wall 6. When coming from the direction indicated with the arrow 3, the driver passes the garage door close to a left door post 7 and when he then steers the motor vehicle into a position parallel to the wall 6 there is the possibility of a rear part of the motor vehicle body coming into contact with the left door post 7.

In order to reliably prevent contact with the walls 4, 5, 6 of the garage 2 or other objects in the area surrounding the vehicle 1, the motor vehicle 1 is equipped with a parking assistance system. A monitoring unit 8 of this parking assistance system includes at least one proximity sensor 9 and a central processor 10 for evaluating signals from the proximity sensor 9. A single direction-resolving proximity sensor can be provided to monitor the area surrounding the motor vehicle 1. The proximity sensors 9 can be of any known type of senser e.g. a radar sensor or an intra-red sensor.

In the case illustrated here three proximity sensors 9 are distributed on the front, right and left side of the motor vehicle 1 in order to monitor a surrounding area (shown hatched in FIG. 1) along the left side 11 of the motor vehicle 1, in front 12 of the motor vehicle 1 and along the right side 13 of the motor vehicle respectively. Another proximity sensor 9 can be provided on rear of the motor vehicle. This has no function as long as the motor vehicle 1 is moving in a forward direction as in FIG. 1. However, when a reverse gear is engaged, the rear sensor may supercede the function of the front sensor in order to now monitor the surrounding area lying ahead of the motor vehicle 1 in the direction of travel.

The motor vehicle 1 is equipped in with pairs of front headlights 14 and indicators 15. If the driver has activated the monitoring unit 8 in order assist parking, the front headlights 14 and/or indicators 15 are controlled by the monitoring unit 8. The monitoring unit 8 can also be connected to a loudspeaker in order to provide the driver with audible feedback in a known manner through acoustic signals about the distance to an object, in this case the garage wall 4, detected in one of the surrounding areas 11, 12, 13.

Figure 2:
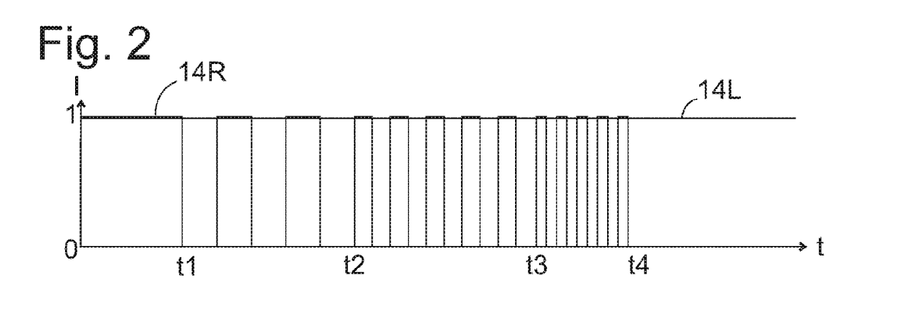
FIG. 2 shows an example of time modulation of light from a lamp of the motor vehicle in FIG. 1.

FIG. 2 shows the change in intensity of the front headlights 14 when parking the motor vehicle 1 along arrow 3 according to a first embodiment of the present disclosure. Over the entire path the surrounding area 11 on the left-hand side of the vehicle 1 is free of detected objects. Therefore the left front headlight 14, as shown by a straight line 14L in FIG. 2, is operated with constant intensity. As shown by the curve 14R, the right front headlight 14 is operated with the same intensity until at time t1 the right garage wall 3 enters the right surrounding area 13. The right front headlight 14 then starts flashing at a first, low frequency in order to alert the driver to the danger that is present. If at a time t2 the distance to the wall 4 is less than a first limit value the frequency of flashing is increased. This can be repeated one or more times, for example at time t3 in the event of distance limit values are undercut. On undercutting a last limit value at time t4 the right front headlight 14 is switched off completely in order to warn the driver in an unmistakable manner.

The indicators 15 can be controlled together with the front headlights 14 or instead of these in the manner described with reference to FIG. 2. In the case of the indicator, on undercutting the last limit value, instead of being completely switched off, continuous operation can be considered.

Switching between dipped or low beam operation and full or high beam operation can also be considered for indicating the danger. For example, when the motor vehicle 1 drives into the garage 2 with the front headlights 14 may be operated in dipped beam mode. When the garage wall 4 comes into the surrounding area 13, the right front headlight 14 initially starts to slowly switch between full and dipped beam and then with increasing frequency as the motor vehicle approaches the wall 4.

Figure 3:
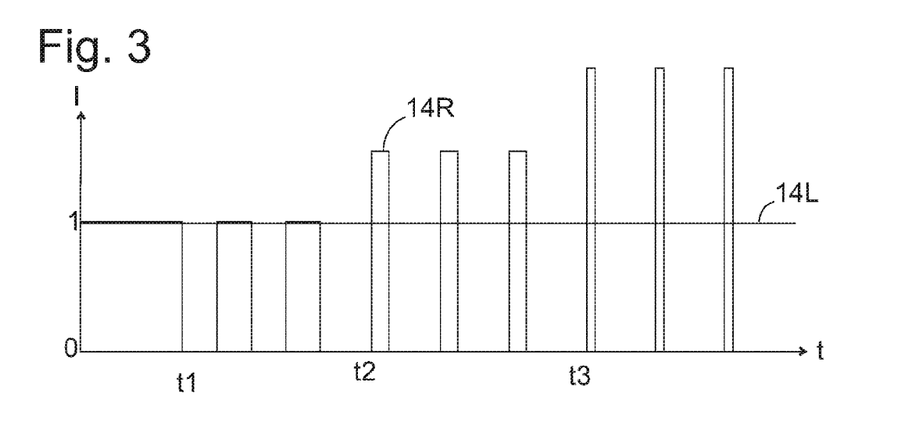
FIG. 3 shows a second example of time modulation.

Instead of the frequency or together with it, the pulse frequency of a flashing light, front headlight 14 or indicator 15 can also be varied depending on the distance of the motor vehicle 1 to a detected object. According to FIG. 3, the pulse frequency becomes smaller and smaller with increasing proximity to the wall 4 and at the same time the light flashes become brighter in order to achieve an at least constant brightness on average, and at the same time give rise to the impression of increasing urgency.

Figure 4:
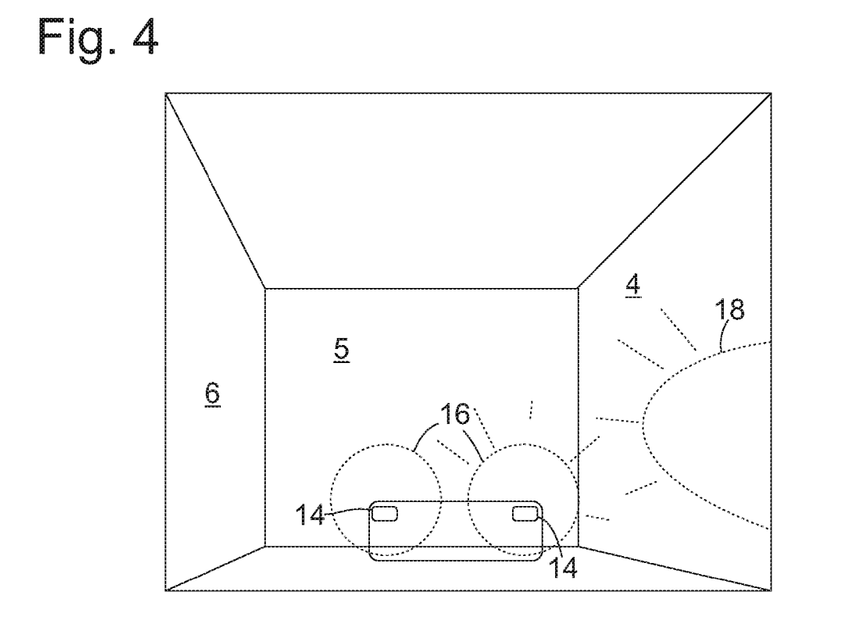
FIG. 4 schematically shows a spatial light distribution according to a first, simple embodiment when approaching an object on the right-hand side of the motor vehicle.

FIG. 4 shows the garage 2 as seen from the perspective of the driver of the motor vehicle when the motor vehicle is in the position shown in FIG. 1. Of the motor vehicle 1, only a front section is schematically shown with headlights 14 which are hidden from the driver's view by the hood of the vehicle. On the end wall 5 light beams 16 of the front headlights 14 can be seen. The left light beam 16 is continuously switched on, the right one flashes in order to indicate the critical proximity of the motor vehicle 1 to the right garage wall 4. As the front headlights 14 do not directly illuminate the side walls 4, 6 of the garage 2 these are relatively dark, therefore for a driver it is very noticeable if in accordance with one modification, the processor 10 controls an indicator 15 mounted on the side of the motor vehicle 1, e.g. on an outside mirror 17 (see FIG. 1), in order to indicate that the wall 4 has been detected in the surrounding zone 13 and a light beam 18 from the indicator hits the garage wall 4.

Figure 5:
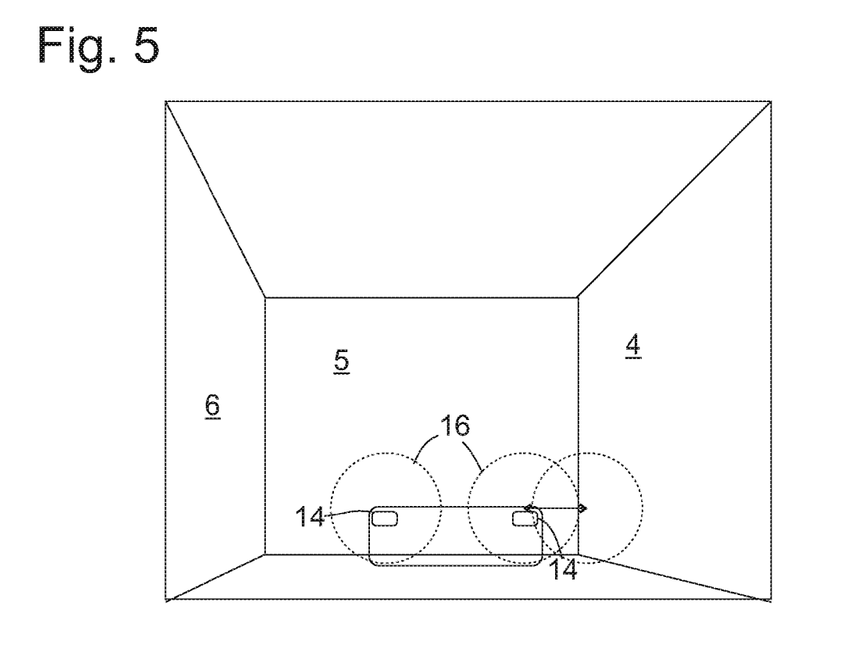
FIG. 5 shows a light distribution when approaching an object on the right-hand side of the motor vehicle according to a second embodiment.

FIG. 5 shows a light distribution in the garage 2 according to a second embodiment of the present disclosure. According to this embodiment the front headlights 14 of the vehicle are adaptive frontlight system (AFS) headlights which when driving on the open road follow the angle of the steering wheel in a known manner. If the driver has activated the monitoring unit 8, the coupling of the alignment of these headlights 14 to the steering wheel position is released. As long as no objects are detected in the surrounding areas 11-13 of the motor vehicle 1, the headlights are orientated straight head in a fixed manner. If the right garage wall 4 enters the monitored area of the vehicle 1 and is detected by the monitoring unit 8, this causes the front headlight 14 to perform a swinging movement so that its light beam 16 moves back and forth on the garage wall as shown by a double arrow in FIG. 5. The frequency of the swinging movement can be varied as a function of the sensed distance to the wall 4 and equally it is possible, as described with reference to FIG. 2 or 3, to modulate the intensity of such a front headlight 14 in accordance with the distance.

Figure 6:
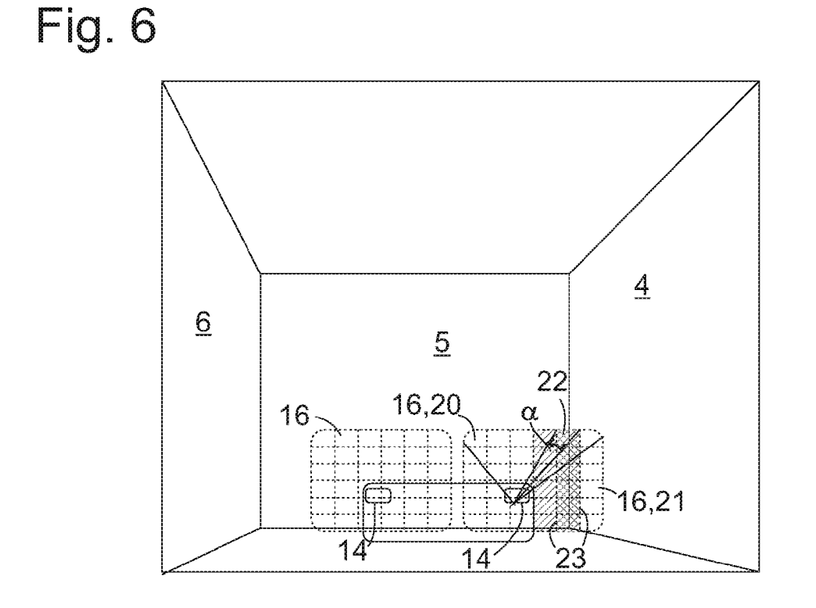
FIG. 6 shows a light distribution when approaching an object on the right-hand side of the motor vehicle according to a third embodiment.

FIG. 6 relates to a third embodiment of the present disclosure according to which the front headlights 14 are matrix headlights, each with a plurality of elemental light sources, in particular LEDs, which can be controlled independently of each other, and the light beams 16 of these front headlights, as indicated in the figure, include light beams of the elemental light sources extending next to each other in a matrix-like manner. In this embodiment the monitoring unit 8 reacts to detecting the entry of the garage well 4 into the surrounding area 13 by switching off a column of elemental lights of the right headlight 14. In this way, the light beam 16 divides into two parts 20, 21 separated by a vertical dark strip 22. The width of the dark strip 22 on the walls of the garage 2 depends on the distance between the walls and the headlight 14. Independent of the distance on the other hand is the opening angle 14 on the headlight between the light-dark boundaries 23 on both sides of the dark strip 22. If the vehicle 1 approaches the wall 4 more closely so that a first distance limit value is undercut, a further column of elemental light sources is switched off and the width of the dark strip 22 or opening angle ($\alpha$) increases. By comparing the width of the dark strip 22 with the overall width of the light beam 14 the driver can estimate the distance to the wall 4.

Figure 7:
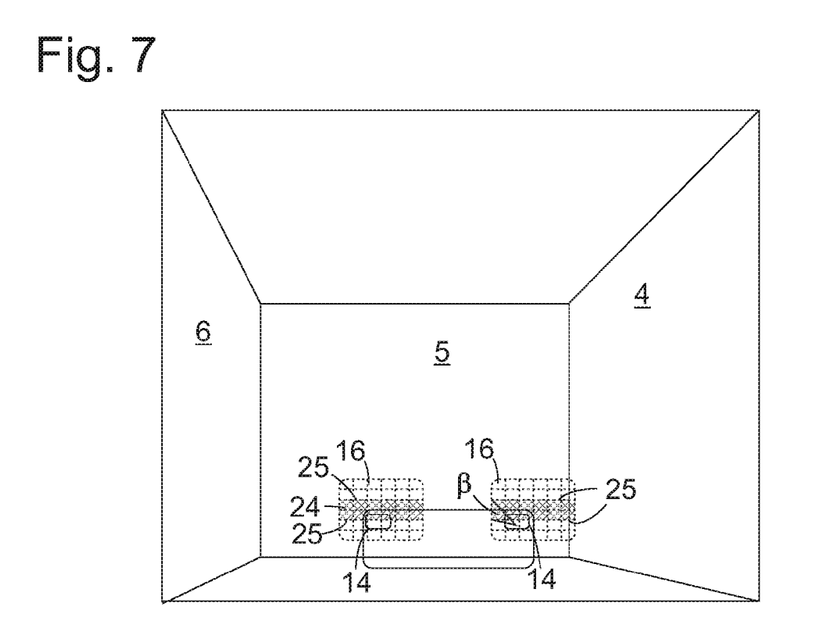
FIG. 7 shows a light distribution when approaching an object in front of the motor vehicle according to a further development of the third embodiment.

If, on entering the garage 2, the motor vehicle 1 keeps a sufficient distance from both side walls 4, 6, the light beams remain complete until the end wall 5 moves into the surrounding area 12 in front of the motor vehicle 1. Approaching the end wall 5 can be signalled to the driver in that a dark strip 22, as shown in FIG. 6, is produced in both light beams 18. More advantageous, however, is the type of control shown in FIG. 7. As a result of the smaller distance of the motor vehicle 1 from the end wall 5, the light beams 18 appear smaller here than in FIG. 6 but their proportions are unchanged. Detecting of the front wall 5 in the surrounding area 12 head results in the switching off of elemental light sources of both front headlights 14 line by line so that in each of the light beam 18 a dark strip 24 with horizontal light-dark boundaries 25 appears. The closer the vehicle 1 gets to the end wall 5 the more lines are switched off and the greater the opening angle $\beta$ of the dark strip 24 becomes.

In the event of simultaneously approaching the end wall 5 and one of the side wall 4, 6 it is conceivable to switch off columns and lines of elemental light sources in the headlight 14 adjacent to the relevant side wall and therefore produce horizontal and vertical dark strips that cross each other.

Figure 8:
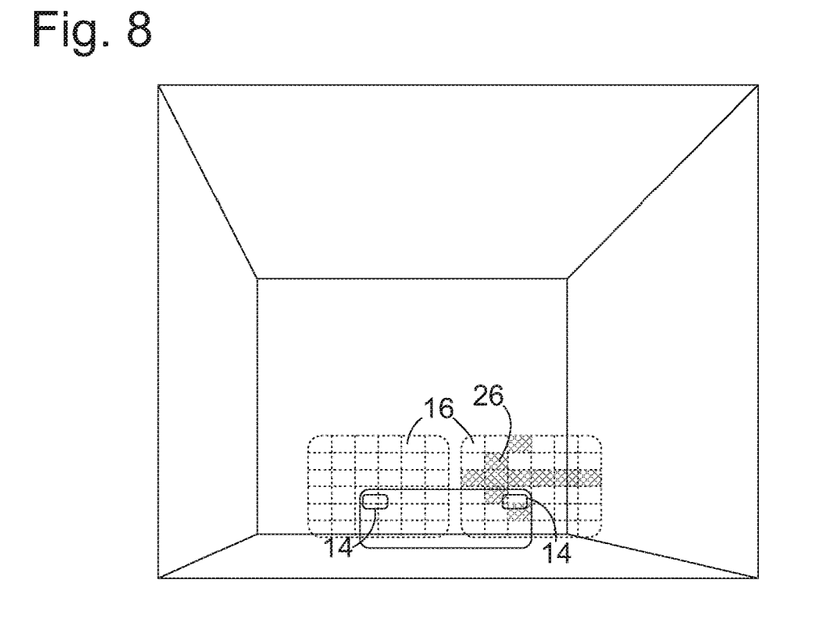
FIG. 8 shows a light distribution according to a fourth embodiment.

According to yet another type, the use of matrix headlights as front headlights 14 allows a critical approach to be indicated to the driver. In FIG. 8 switched off elemental light sources of the right headlight 14 produce the images of an arrow in its light beam 16, in this case an arrow 26 pointing to the left, which immediately makes it clear to the driver in which direction he should steer. If the number of elemental light sources of the headlight so permits, the distance to the wall can be made visible to the driver by the size of the arrow 26. However, also conceivable is a flashing visualization of the arrow 26 with a frequency dependent on distance or pulse frequency dependent on distance as mentioned with reference to FIG. 2, 3. Approaching of the end wall 5 can be visualised by downward pointing arrows in both light beams 18, and simultaneous approaching of the end wall 5 and a side wall by an arrow obliquely pointing to the middle.

Figure 9:
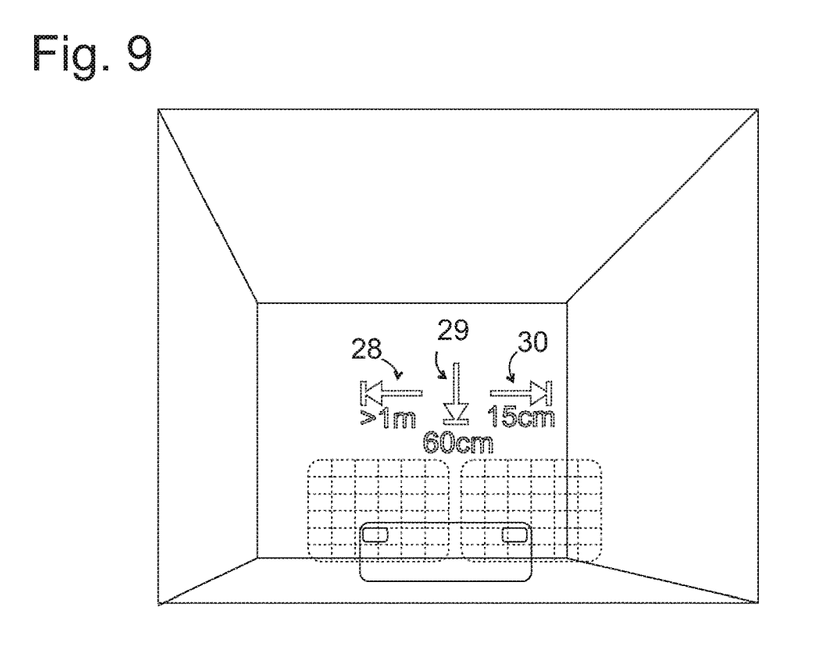
FIG. 9 shows a light distribution according to a fifth embodiment.

A maximum degree of convenience for the driver is achievable if in addition to the headlights 14 and indicators 15 the motor vehicle 1 also has a lamp in the form of a projector 27 (see FIG. 1), e.g. a DLP projector with which images contents can be projected. Such a projector 27 can be used when travelling on the open road to project directions of a satellite navigation system, pictures of traffic signs or suchlike onto the roadway in front of the motor vehicle 1. In the context of the present disclosure the projector 27 can be used, as shown in FIG. 9, to project in the direction of travel quantitative information about the measured distance to objects in the surrounding area 11, 12, 13. In FIG. 9 the image projected by the projector 27 includes three parts 28, 29, 30 which respectively correspond to areas 11, 12, 13.

In this way the driver recognizes on part 30 that the distance to the right garage wall 4 is currently 15 cm and on part 29 that the distance to the end wall 5 is 60 cm. The indication ">1 m" in part 28 shows that the distance to the left garage wall 6 is so large that it is still outside the monitored area 11 and that no valid measurement of its distance is available. If no object is detected in the monitored area the corresponding part of the projected image, i.e. part 28 in this case, can also remain dark.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A parking assistance system for a motor vehicle comprising:
    a monitoring unit configured to detect an object in a zone surrounding the motor vehicle and to sense a bearing of the detected object; and
    a lighting system operably coupled to the monitoring unit and configured to emit light in an area surrounding the motor vehicle;
    wherein the monitoring unit controls a distribution of the emitted light as a function of the sensed bearing,
    wherein the monitoring unit is further configured to determine when the detected object is on a left-side of the vehicle or on a right-side of the vehicle, and to produce a first distribution of emitted light when no object is detected, a second distribution of emitted light when the detected object is on the left-side of the motor vehicle and a third distribution of emitted light when the detected object is on the right-side of the motor vehicle,
    wherein the lighting system comprises a first light located on the left-side of the motor vehicle and a second lights located on the right-side of the motor vehicle opposite the first light, the first and second lights being operable in a first operating state and a second operating state different from the first operating state; and wherein the monitoring unit is further configured to operate the first and second lights in the first operating state for producing the first distribution, to operate the first light in the first operating state and the second light in the second operating state for producing the second distribution, and to operate the first light in the second operating state and the second light in the first operating state for producing the second distribution,
    wherein the monitoring unit is further configured to sense the distance of the detected object from the vehicle and to control a light property of the lighting system in the second operating state as a function of the sensed distance, and
    wherein the controlled light property comprises an opening angle defined between a light boundary and a dark boundary of the light emitted by the first and second lights in the second operating state.

2. The parking assistance system according to claim 1, wherein the lighting system is further configured to emit light in a direction of the detected object.

3. The parking assistance system according to claim 1, wherein the first and second lights comprise a pair of lights selected from the group consisting of indicator lights or headlights.

4. The parking assistance system according to claim 1, wherein the controlled light property is selected from the group consisting of a light intensity, a light color, a spatial light distribution, a temporal light distribution or a combination thereof.

5. The parking assistance system according to claim 1, wherein the lighting system is operable in a third operating state and the orientation of the light boundary and the dark boundary is different in the second operating state and the third operating state.

6. The parking assistance system according to claim 1, wherein the monitoring unit is further configured to determine when the detected object is ahead of the motor vehicle in a direction of travel and to produce a fourth distribution of light when the detected object is ahead of the vehicle.

7. The parking assistance system according to claim 6, wherein the monitoring unit is configured to produce the fourth distribution of light through operating the first and second lights in the second operating state.

8. The parking assistance system according to claim 6, wherein the lighting system is operable in a third operating state and the monitoring unit is configured to produce the fourth distribution of light through operating both lights in the third operating state.

9. A method of assisting the parking of a motor vehicle comprising:
    detecting an object in a zone surrounding the motor vehicle;
    sensing a bearing of the detected object;
    emitting light in an area surrounding the motor vehicle;
    controlling a distribution of the emitted light as a function of the sensed bearing;

sensing a distance of the detected object from the motor vehicle; and controlling a light property of the light as a function of the sensed distance, and wherein the controlled light property comprises an opening angle defined between a light boundary and a dark boundary of the emitted light.

10. The method according to claim 9, wherein emitting light in an area surrounding the motor vehicle comprises emitting light in a direction of the detected object.

11. A non-transitory computer-readable medium comprising program instructions, which when executed on a computer, perform:

detecting an object in a zone surrounding the motor vehicle;

sensing a bearing of the detected object;

emitting light in an area surrounding the motor vehicle;

controlling a distribution of the emitted light as a function of the sensed bearing;

sensing a distance of the detected object from the motor vehicle; and     controlling a light property of the light as a function of the sensed distance, and     wherein the controlled light property comprises an opening angle defined between a light boundary and a dark boundary of the emitted light.

* * * * *